(12) United States Patent
Guo et al.

(10) Patent No.: US 8,687,732 B2
(45) Date of Patent: *Apr. 1, 2014

(54) ARCHITECTURE AND METHODS FOR COEXISTENCE OF WIRELESS RADIOS HAVING DIFFERING PROTOCOLS

(75) Inventors: Xingang Guo, Portland, OR (US); Xue Yang, Portland, OR (US); Hsin-Yuo Liu, San Jose, CA (US); Eran Sudak, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/477,596

(22) Filed: May 22, 2012

(65) Prior Publication Data

US 2012/0230303 A1 Sep. 13, 2012

Related U.S. Application Data

(63) Continuation of application No. 11/697,369, filed on Apr. 6, 2007, now Pat. No. 8,189,710.

(51) Int. Cl.
*H04L 27/00* (2006.01)
(52) U.S. Cl.
USPC .......................................................... 375/295
(58) Field of Classification Search
USPC ............... 375/295, 316, 346; 455/502, 552.1; 370/254
See application file for complete search history.

(56) References Cited

U.S. PATENT DOCUMENTS

| | | | |
|---|---|---|---|
| 6,990,082 B1 | 1/2006 | Zehavi et al. | |
| 7,046,649 B2 | 5/2006 | Awater et al. | |
| 7,142,880 B2 | 11/2006 | Schmandt et al. | |
| 7,725,118 B2 | 5/2010 | Yang et al. | |
| 7,941,178 B2 | 5/2011 | Guo et al. | |
| 8,189,710 B2* | 5/2012 | Guo et al. | 375/295 |
| 2002/0075941 A1 | 6/2002 | Souissi et al. | |
| 2002/0136184 A1* | 9/2002 | Liang et al. | 370/338 |
| 2005/0201340 A1 | 9/2005 | Wang et al. | |
| 2006/0003802 A1 | 1/2006 | Sinai et al. | |
| 2007/0036170 A1 | 2/2007 | Gonikberg et al. | |
| 2007/0140154 A1* | 6/2007 | Chun | 370/311 |
| 2007/0232358 A1 | 10/2007 | Sherman et al. | |
| 2007/0238483 A1 | 10/2007 | Boireau et al. | |
| 2007/0275746 A1* | 11/2007 | Bitran | 455/509 |
| 2008/0247367 A1 | 10/2008 | Guo et al. | |
| 2008/0247445 A1 | 10/2008 | Guo et al. | |

FOREIGN PATENT DOCUMENTS

| | | | |
|---|---|---|---|
| WO | WO-2008124434 A1 | 10/2008 | |
| WO | WO-2008124445 A1 | 10/2008 | |

OTHER PUBLICATIONS

"U.S. Appl. No. 11/697,366, Non-Final Office Action mailed Jul. 20, 2010", 12 pgs.
"U.S. Appl. No. 11/697,366, Notice of Allowance mailed Jan. 5, 2011", 13 pgs.

(Continued)

*Primary Examiner* — Kevin M Burd
(74) *Attorney, Agent, or Firm* — Schwegman, Lundberg & Woessner, P.A.

(57) ABSTRACT

Embodiments of systems and methods for the coexistence of wireless radios having differing protocols are generally described herein. Other embodiments may be described and claimed. In some embodiments systems and methods for synchronizing clocks between two radios, and using a signal to notify one of the radios to refrain from transmitting for a timeperiod are described.

22 Claims, 3 Drawing Sheets

(56) References Cited

OTHER PUBLICATIONS

"U.S. Appl. No. 11/697,366, Response filed Oct. 20, 2010 to Non Final Office Action mailed Jul. 20, 2010", 11 pgs.
"U.S. Appl. No. 11/697,369 , Response filed Oct. 25, 2011 to Non Final Office Action mailed Jul. 25, 2011", 8 pgs.
"U.S. Appl. No. 11/697,369, Final Office Action mailed Apr. 5, 2011", 8 pgs.
"U.S. Appl. No. 11/697,369, Final Office Action mailed May 4, 2010", 10 pgs.
"U.S. Appl. No. 11/697,369, Final Office Action mailed Nov. 16, 2011", 8 pgs.
"U.S. Appl. No. 11/697,369, Non Final Office Action mailed Jul. 25, 2011", 11 pgs.
"U.S. Appl. No. 11/697,369, Non Final Office Action mailed Nov. 10, 2009", 8 pgs.
"U.S. Appl. No. 11/697,369, Non-Final Office Action mailed Sep. 21, 2010", 12 pgs.
"U.S. Appl. No. 11/697,369, Notice of Allowance mailed Feb. 1, 2012", 5 pgs.
"U.S. Appl. No. 11/697,369, Response filed Jan. 16, 2012 to Final Office Action mailed Nov. 16, 2011", 8 pgs.
"U.S. Appl. No. 11/697,369, Response filed Feb. 9, 2010 to Non Final Office Action mailed Nov. 10, 2009", 9 pgs.
"U.S. Appl. No. 11/697,369, Response filed Feb. 22, 2011 to Non Final Office Action mailed Sep. 21, 2010", 8 pgs.
"U.S. Appl. No. 11/697,369, Response filed Jun. 29, 2011 to Final Office Action mailed Apr. 5, 2011", 9 pgs.
"U.S. Appl. No. 11/697,369, Response filed Sep. 1, 2010 to Final Office Action mailed May 4, 2010", 9 pgs.
"Chinese Application Serial No. 200880018707.8, Office Action mailed Nov. 3, 2011", 12 pgs.
"Chinese Application Serial No. 200880018707.8, Response filed Mar. 19, 2012 to Office Action mailed Nov. 3, 2011", 3 pgs.
"International Application Serial No. PCT/US2008/059131, Search Report and Written opinion mailed Aug. 20, 2008", 3 pgs.
"International Application Serial No. PCT/US2008/059131, Written Opinion mailed Aug. 20, 2008", 4 pgs.
"International Application Serial No. PCT/US2008/059153, Search Report mailed Jul. 11, 2008", 3 pgs.
"International Application Serial No. PCT/US2008/059153, Written Opinion mailed Jul. 11, 2008", 5 pgs.
Acharya, A., et al., "MACA-P: a MAC for cocurrent transmissions in multi-hop wireless networks", Proceedings of the First IEEE International Conference on Pervasive Computing and Communications, (2003), 505-508.
Guo, X., et al., "Architecture and Methods for Coexistence of Wireless Radios Having Differing Protocols", U.S. Appl. No. 11/697,369, filed Apr. 6, 2007.
Guo, X., et al., "Systems and Methods for Scheduling Transmissions for Coexistence of Differing Wireless Radio Protocols", U.S. Appl. No. 11/697,366, filed Apr. 6, 2007.
Liu, C., et al., "Minimizing Mutual Interference for Multi-Radio Co-existence Platforms", U.S. Appl. No. 11/904,362, filed Sep. 27, 2007.
"Chinese Application Serial No. 200880018707.8, Office Action mailed Jan. 18, 2013", 8 pgs.
"Chinese Application Serial No. 200880018707.8, Office Action mailed Aug. 2, 2012", 13 pgs.
"Chinese Application Serial No. 200880018707.8, Response filed Sep. 11, 2012 to Office Action mailed Sep. 11, 2012", 22 pgs.
"International Application Serial No. PCT/US2008/059153, International Preliminary Report on Patentability mailed Oct. 15, 2009", 8 pgs.

\* cited by examiner ously illustrate specific embodiments of the inventive subject matter to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the inventive subject matter set forth in the claims encompass all available equivalents of those claims. Embodiments of the inventive subject matter may be referred to herein, individually or collectively, by the term "invention" merely for convenience and without intending to limit the scope of this application to any single invention or inventive concept if more than one is in fact disclosed.

ARCHITECTURE AND METHODS FOR COEXISTENCE OF WIRELESS RADIOS HAVING DIFFERING PROTOCOLS

PRIORITY APPLICATION

This application is a continuation of U.S. application Ser. No. 11/697,369, filed Apr. 6, 2007 now U.S. Pat. No. 8,189,710, which is incorporated herein by reference in its entirety.

TECHNICAL FIELD

The present inventive subject matter pertains to wireless communications. Some embodiments may pertain to architecture and methods for coexistence of wireless radios having differing protocols.

BACKGROUND

With the increasing availability of wireless technology and connectivity, devices carrying multiple radios will not be uncommon. As one example, combinations of Bluetooth, WiFi and WiMAX technologies may be made available on future computation and communication platforms such as laptops and handheld devices. These types of platforms may be equipped with multiple co-located radios. Such platforms may be referred to as a Multi-Radio Platforms (MRPs). MRPs may include the co-location of Bluetooth, WiMAX and even WiFi radios to accommodate various uses and conveniences. One typical usage scenario for the multiple radios includes the MRP relaying voice traffic between its WiMAX and Bluetooth links. A Bluetooth headset may connect to the MRP via a Bluetooth link and the MRP, at the same time, may maintain an active WiMAX VoIP session with WiMAX base station.

Bluetooth and WiMAX may operate in overlapping or adjacent frequency bands and possibly suffer from interference when they operate at substantially overlapping time instants. Interference may occur, for example, due to physical proximity and radio power leakage. The following interferences, also referred to as BT and WiMAX collisions can occur:

1. When Bluetooth transmission overlaps with WiMAX receiving in time domain at the MPR, WiMAX receiving can suffer; and
2. WiMAX transmissions can also interfere with Bluetooth receiving operations at the MPR when they overlap in time.
3. Similarly, interference may also be caused when WiMAX transmission and Bluetooth transmission operations overlap in time.

Thus, there are general needs for system architecture to allow concurrent communications between devices implementing different protocols with reduced interference.

DETAILED DESCRIPTION

Figure 1:
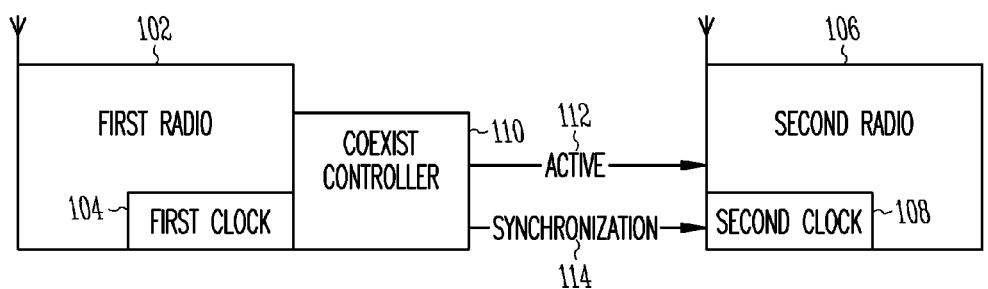
FIG. 1 is a block diagram of a radio coexistence system according to various embodiments.

The following description and the drawings sufficiently illustrate specific embodiments of the inventive subject mat- FIG. 1 is a block diagram of a radio coexistence system according to various embodiments. The system 100 comprises a first radio 102 including a first clock 104, a second radio 106 including a second clock 108, a coexist controller 110, an active link 112 and a synchronization link 114.

The first radio 102 may operate as a transceiver being able to transmit and receive wireless signals on one of a number of possible wireless networks, using various transmission protocols. The first radio may include a first clock 104 which may be used to regulate transmissions by providing consistent timing. The second radio 106 may likewise operate as a transceiver being able to transmit and receive wireless signals on one of a number of possible wireless networks using various transmission protocols. The second radio 106 also may employ a second clock 108 to regulate transmission timing. Depending on the wireless networks and protocols used by the first radio 102 and the second radio 106, interference between the two radios may occur. Interference is more common when the first radio 102 and the second radio 106 operate within the same or nearby frequency bands.

By allowing the first radio 102 and the second radio 106 to communicate and adjust, interference may be reduced. A coexist controller 110 may be utilized to coordinate the communication between the radios. The coexist controller 110 may be integrated into the first radio 102 or may optionally be external to the first radio 102. The coexist controller 110 may have a connection to the first clock 104, and may be able to determine when the first radio 102 is transmitting or receiving. The connection may be a wired connection, an optical connection, a wireless connection, or other connection types. With information from the connection with the first clock 104, the coexist controller 110 may be able to transmit a signal over a synchronization link 114 to the second radio 106. The signal over the synchronization link 114 may allow the second radio 106 to synchronize the second clock 108 with the first clock 104. The second radio 106 may synchronize the second clock 108 by adjusting the second clock 108 to begin a clock cycle in sync with the signal sent over the synchronization link 114. An optional offset may additionally be employed when synchronizing the second clock 108 with the first clock 104 as needed, allowing the second clock 108 to be synchronized with an offset with respect to the first clock 104.

The coexist controller 110 may also transmit a signal over the active link 112. The signal transmitted over the active link 112 may notify the second radio 106 that the first radio 102 is either transmitting or receiving. Upon receiving the signal over the active link 112, the second radio will refrain from transmitting. The signal sent over the active link 112 may last for a finite timeperiod. Once the timeperiod has expired and the signal is cleared, the second radio 106 may transmit again. If the system 100 is configured to avoid interference between receptions from the first radio 102 and transmissions from the second radio 106, the signal sent by the coexist controller 110 over the active link 112 will notify the second radio 106 that the first radio is receiving. Thus the second radio 106 will not transmit while the first radio 102 is receiving, and interference may be avoided. Alternatively, if the system 100 is configured to avoid interference between transmissions from the first radio 102 and transmissions from the second radio 106, the signal sent by the coexist controller 110 over the active link 112 will notify the second radio 106 that the first radio is transmitting. Thus the second radio 106 will not transmit while the first radio 102 is transmitting, and interference may be avoided.

Figure 2:
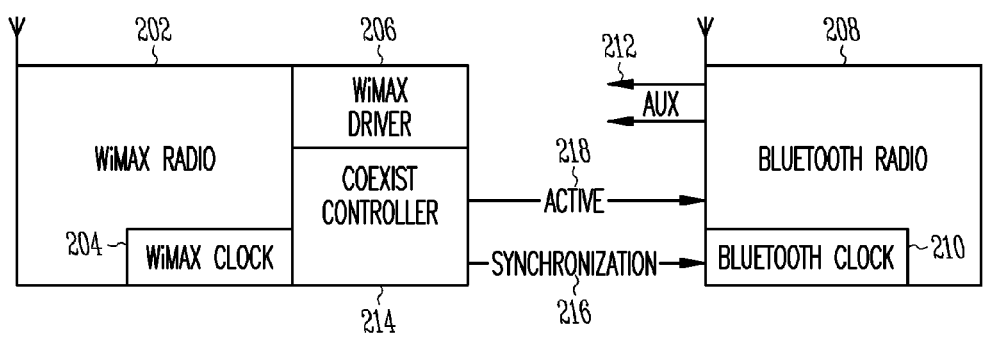
FIG. 2 is a block diagram of an example radio coexistence system according to various embodiments.

FIG. 2 is a block diagram of an example radio coexistence system 200 according to various embodiments. The system 200 comprises a WiMAX radio 202, a WiMAX clock 204, a WiMAX driver 206, a Bluetooth radio 208, a Bluetooth clock 210, auxiliary links 212, a coexist controller 214, a synchronization link 216, and an active link 218.

This example implementation demonstrates a coexistence system 200 with a WiMAX radio 202 and a Bluetooth radio 208. Although this and other embodiments will be described with respect to Bluetooth and WiMAX radios and protocols, the scope of the invention is not limited in this respect and may apply to any communication radios and protocols that potentially interfere.

The WiMAX radio 202 includes a WiMAX clock 204 to allow for consistent transmission timing and synchronization with WiMAX base stations. Similarly, the Bluetooth radio 208 includes a Bluetooth clock 210 to allow for consistent transmission timing. As described above, in order to facilitate coexistence and allow for communication between the radios, a coexist controller 214 may be used. The coexist controller 214 may be internal or external to the WiMAX radio 202, but nevertheless in communication. The coexist controller 214 may access or communicate with the WiMAX clock 204 in order to create a FRAME_SYNC signal to be transmitted over the synchronization link 216 to the Bluetooth radio. The FRAME_SYNC signal may be a periodic signal created from the WiMAX clock 204. The periodic FRAME_SYNC may optionally be offset a predetermined amount from the WIMAX clock 204. Different offset amounts may be used with different wireless frame sizes associated with the WiMAX radio 202 and the Bluetooth radio 208. Additionally, different offset amounts may be used with different working modes or interference scenarios. When the FRAME_SYNC signal is received at the Bluetooth radio 208 over the synchronization link 216, the Bluetooth clock 210 may be synchronized with the signal. This may effectively synchronize the Bluetooth clock 210 with the WiMAX clock 204, or at least align the two with a predetermined offset.

In general, there may be four types of WiMAX/Bluetooth interference: (1) WiMAX transmission (TX) interferes Bluetooth reception (RX), (2) WiMAX TX interferes Bluetooth TX, (3) Bluetooth TX interferes with WiMAX RX, (4) WiMAX RX conflicts with Bluetooth RX. The interference scenario of a system can be a combination of those four. Two working modes covering these interference types may b described as: "TX/RX-conflict mode" and "TX/TX-conflict mode". TX/RX-conflict mode refers to the combination of type (1) and (3); TX/TX-conflict mode refers to the combination of type (2) and (4) (for example, when WiMAX TX signal is much stronger than the Bluetooth TX signal, WiMAX TX can severely affect Bluetooth transmissions due to power amplifier (PA) distortion and inter-modulation).

Depending on whether the system 200 is dealing with TX/RX-conflict mode or TX/TX-conflict mode, the coexist controller 214 may need to know when to send a WIMAX_ACT signal over the active link 218 to the Bluetooth radio 208. The WIMAX_ACT signal notifies the Bluetooth radio 208 when the WiMAX radio 202 is "active", and the Bluetooth radio 208 should not transmit. In the case of TX/RX-conflict mode, the WIMAX_ACT signal should be sent when the WiMAX radio 202 is receiving. In the case of TX/TX-conflict mode, the WIMAX_ACT signal should be sent when the WiMAX radio 202 is transmitting. The WiMAX driver 206 may instruct the coexist controller 214 as to the present mode of operation and thus when the WIMAX_ACT signal should be sent over the active link 218. While the WIMAX_ACT signal notifies the Bluetooth radio 208 not to transmit, the absence of a WIMAX_ACT signal on the active link 218 may alert the Bluetooth radio 208 to refrain from reception or receiving incoming transmissions. This would not only avoid WiMAX interference with Bluetooth transmissions, but also interference with Bluetooth receptions in accordance with either TX/RX-conflict mode or TX/TX-conflict mode. Additionally, an offset in the FRAME_SYNC signal sent over the synchronization link 216 may be determined based on whether the system 200 is dealing with TX/RX-conflict mode or TX/TX conflict mode. For a WiMAX radio 202 transmitting wireless frames of 5 ms duration, and a Bluetooth radio 208 transmitting in SCO intervals having six 0.625 ms slots, the WiMAX radio 202 wireless frame would have the equivalent of 8 slots. With this configuration, an example offset between the start of the Bluetooth SCO interval and the start of the WiMAX frame for TX/RX-conflict mode may be a 1 slot offset. An example offset for TX/TX-conflict mode may be a 0 slot offset, or no offset. Differing offsets may yield differing interference avoidance results.

Many current Bluetooth radios 208 may be setup for coexistence with WiFi or other like devices. The Bluetooth radio 208 may use various techniques, examples of which are described in the IEEE 802.15.2 specification. These techniques may use one or more auxiliary links 212 to provide attempted interference mitigation. These auxiliary links 212 may be used alone or in conjunction with the active link 218. Embodiments including more than two radios and the use of the auxiliary links 212 are described in more detail with reference to FIGS. 4A and 4B.

Additionally, Bluetooth radio 208 may utilize one of various Bluetooth link configurations. Link configurations include EV3, HV3, HV1, and others. In the case that the Bluetooth radio 208 uses a Bluetooth EV3 link, it may follow the standard retransmission policies including retransmitting a failed transmission during a retransmission window. In this circumstance, when the Bluetooth radio 208 refrains from transmitting due to a WIMAX_ACT signal on the active link 218, the Bluetooth radio 208 may treat that transmission as a failed transmission. The Bluetooth radio 208 may retransmit the potentially interfering transmission in the retransmission window, when the WIMAX_ACT signal is no longer present on the active link 218. This retransmission method may apply for a number of other wireless radios and associated transmission protocols. A transmission that is restricted from being transmitted due to activity on another radio may be rescheduled and retransmitted at a later time. Additionally, receptions that may not be available to be received because of interference from another co-located radio or radios may be rescheduled and polled if necessary for retransmission at another time.

Figure 3:
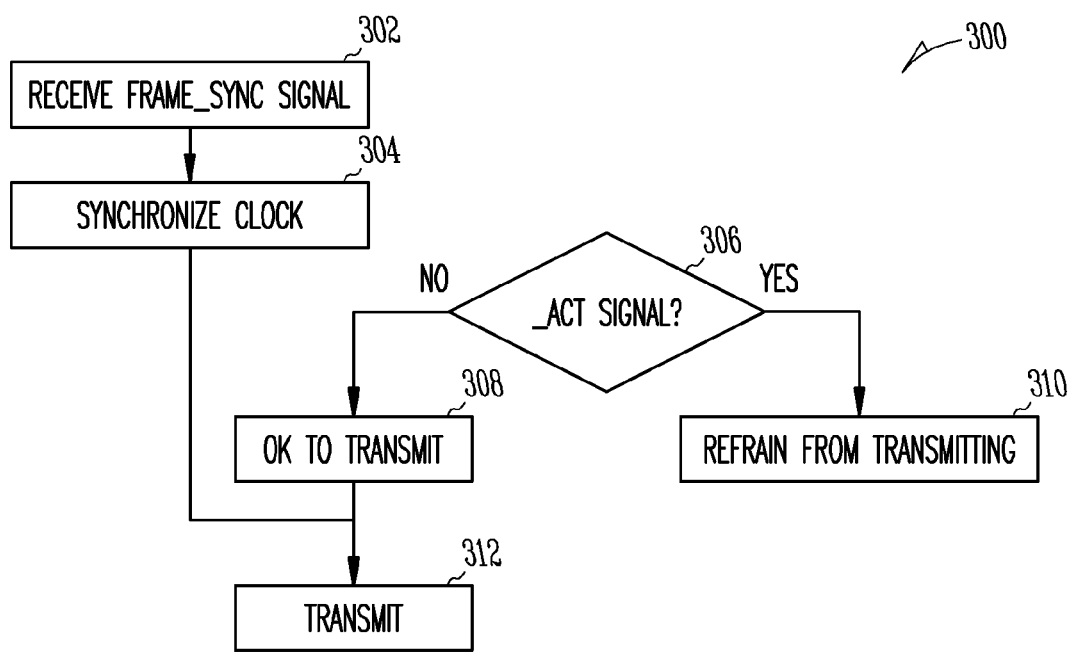
FIG. 3 is a flow diagram illustrating a method in accordance with various embodiments.

FIG. 3 is a flow diagram illustrating a method 300 in accordance with various embodiments. The method 300 begins with a first radio receiving a FRAME_SYNC signal from a co-located second radio (302). The FRAME_SYNC signal may be any signal which is periodic and based on the second radio's clock signal. The FRAME_SYNC signal may be aligned with the second radio's clock signal or may be offset by an amount. Depending on the mode of operation for the type of interference to be avoided, various offset amounts may be utilized. The first radio may use the FRAME_SYNC signal to synchronize its clock (304). By synchronizing with the FRAME_SYNC signal, the first radio is essentially aligning its clock with the clock in the second radio, plus or minus any offset.

In order to begin a transmission, the first radio may determine whether or not it is receiving an _ACT signal (block 306). The _ACT signal may be any signal sent from the second radio to the first radio indicating that the second radio is performing an action. The action, for example, may be the second radio transmitting or receiving. According to some embodiments, the _ACT signal may be described as a WIMAX_ACT signal, a WLAN_ACT signal, or other notations. If the first radio determines that it is not currently receiving an _ACT signal, the first radio is okay to transmit data (block 308). Alternatively, if the first radio determines that it is currently receiving an _ACT signal, the first radio may refrain from transmitting (block 310). If the first radio is not currently receiving an _ACT signal, and it is okay to transmit (block 308), it may proceed to transmit (block 312) within its wireless frame using the synchronized clock signal.

Additionally, according to various embodiments, when the first radio determines that it is not receiving an _ACT signal, and it is okay to transmit (block 308), it may refrain from receiving. Similarly, when the first radio determines that it is receiving an _ACT signal, and it refrains from transmitting (block 310), it may determine it is okay to receive.

Figure 4A:
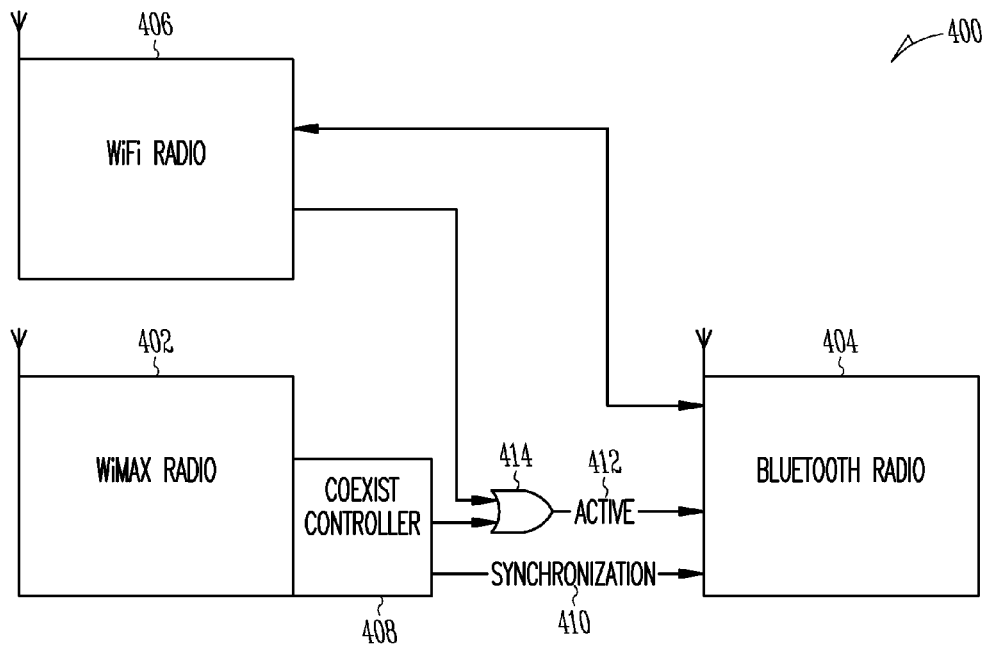
FIG. 4A is a block diagram of an example multi-radio coexistence system according to various embodiments.

FIG. 4A is a block diagram of an example multi-radio coexistence system 400 according to various embodiments. The system 400 includes three radios, a WiMAX radio 402, a Bluetooth radio 404, and a WiFi radio 406. The system 400 also includes a coexist controller 408, synchronization link 410, active link 412 and an OR gate 414.

As described above, the WiMAX radio 402 communicates with the coexist controller 408 to communicate with the Bluetooth radio 404. The coexist controller may use the synchronization link 410 to allow the clocks in the Bluetooth radio 404 and in the WiMAX radio 402 to synchronize. The coexist controller 408 may also use the active link 412 to inform the Bluetooth radio 404 when the WiMAX radio 402 is actively transmitting or when it is actively receiving. In the case of the system 400 of FIG. 4A, an additional radio is present, a WiFi radio 406. Standards and techniques may be available for allowing the coexistence between the Bluetooth radio 404 and the WiFi radio 406. Some Bluetooth radios provide a coexistence interface to support Packet Arbitration between a Bluetooth radio 404 and a WiFi radio 406. Multiple variations of the Bluetooth radio 404 to WiFi radio 406 coexistence interface (e.g., 2-wire, 3-wire or 4-wire interfaces) are available, and may work in conjunction with embodiments of the inventive subject matter.

The WiFi radio 406 may use the active link 412 or a similar link to notify the Bluetooth radio that it is "active." Being "active" may mean that the WiFi radio 406 is transmitting, receiving, or performing another function. The WiFi radio 406 may communicate with the Bluetooth radio 404 as it generally would, except that it may share the active link 412 with the WiMAX radio 402 coexist controller 408. In order to share the active link 412 to the Bluetooth radio 404 between the WiFi radio 406 and the WiMAX radio 402 coexist controller 408, an OR gate 414 may be used. The OR gate 414 may have input connections coming from the WiFi radio 406 and from the coexist controller 408 associated with the WiMAX radio 402. The output of the OR gate 414 along the active link 412 connects to the Bluetooth radio 404. Thus the OR gate 414 may allow the Bluetooth radio 404 to receive signals over the active link 412 from either the coexist controller 408 or the WiFi radio 406.

In this way, the addition of the WiMAX radio 402, the coexist controller 408 and the synchronization link 410 to communicate with the Bluetooth radio 404 may not affect the communications or operation of the WiFi radio 406.

Figure 4B:
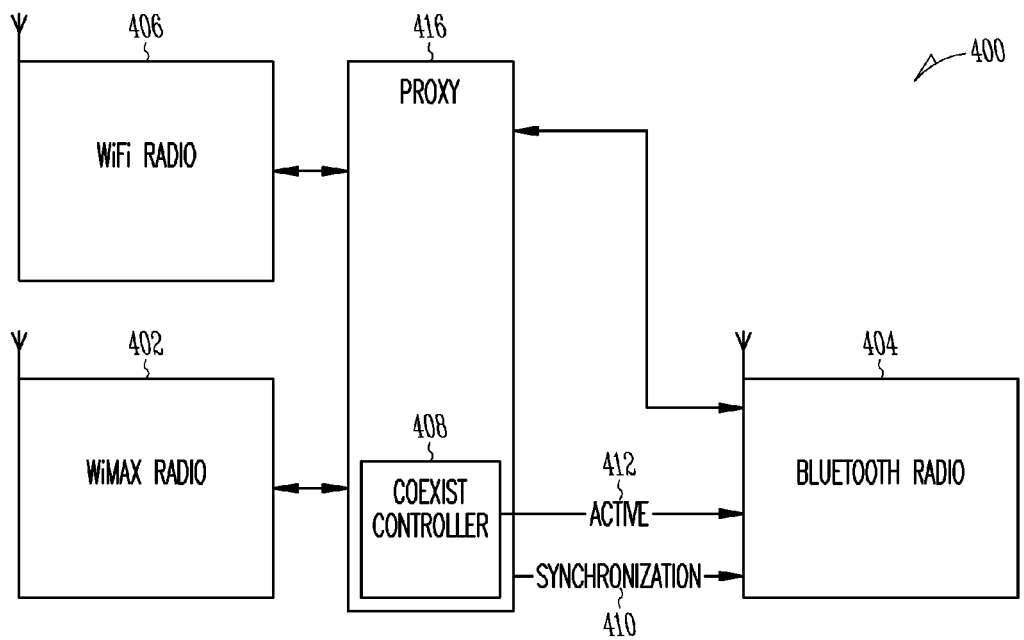
FIG. 4B is a block diagram of another example multi-radio coexistence system according to various embodiments.

FIG. 4B is a block diagram of another example multi-radio coexistence system 400 according to various embodiments. The system 400 of FIG. 4B is similar to the system 400 of FIG. 4A, but includes a proxy 416 instead of an OR gate 414 (FIG. 4A). The proxy 416 may contain the coexist controller 408 according to various embodiments. The proxy 416 may operate to generate signals to allow connected and co-located radios to communicate. The proxy 416 may be connected to the WiMAX radio 402, the Bluetooth radio 404 and the WiFi radio 406. According to various embodiments, the proxy may be hardware based, software based, a radio controller, a microprocessor, or a number of other devices.

The system 400 is an example implementation of an embodiment of the inventive subject matter. In the examples above, WiMAX, Bluetooth, and WiFi radios are used to illustrate embodiments with three differing wireless protocols. Other types of radios operating on various networks utilizing various protocols may be implemented within the scope of the inventive subject matter.

Although the system 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

In some embodiments, the communication systems and methods may be implemented in accordance with specific communication standards, such as the Institute of Electrical and Electronics Engineers (IEEE) standards including the IEEE 802.16-2004 and the IEEE 802.16(e) standards for wireless metropolitan area networks (WMANs), as well as the IEEE 802.15 standards for wireless personal area networks (WPANs) including variations and evolutions thereof, although the scope of the inventive subject matter is not limited in this respect as the communication systems and methods may also be suitable for transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions. For more information with respect to the IEEE 802.15 standards, please refer to "IEEE Standard for Information technology—Telecommunications and information exchange between systems—Local and metropolitan area networks—Specific requirements. Part 15.1: Wireless Medium Access Control (MAC) and Physical Layer (PHY) Specifications for Wireless Personal Area Networks (WPANs)."

In some embodiments, devices using the radios described above may be portable wireless communication devices, such as personal digital assistants (PDAs), a laptops or portable computers with wireless communication capability, web tablets, wireless telephones, wireless headsets, pagers, instant messaging devices, digital cameras, access points, televisions, video gaming systems, medical devices (e.g., a heart rate monitor, a blood pressure monitor, etc.), or other devices that may receive and/or transmit information wirelessly. In some embodiments, a radio may operate using directional antennas, beam-forming antennas, omnidirectional antennas, multiple-input multiple-output (MIMO) antenna systems, adaptive antenna systems (AAS), diversity antennas, or other antenna configurations.

Some embodiments may be implemented in one or a combination of hardware, firmware, and software. Embodiments of the inventive subject matter may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wireless communication device comprising:
   a first transceiver configured to transmit a wireless radio frame during a scheduled timeperiod according to a wireless access network protocol; and
   a second transceiver coupled to the first transceiver over a synchronization link and configured to transmit and receive within respective slots of a Bluetooth interval that occur during an unscheduled timeperiod, and configured to refrain from transmitting and receiving during the scheduled timeperiod, wherein the Bluetooth interval includes a transmission window portion and a retransmission window portion;
   wherein the first transceiver is operable to transmit, to the second transceiver, a plurality of signals from a coexist controller associated with the first transceiver, one of the signals allowing the second transceiver to synchronize the Bluetooth interval with an offset with respect to a start of a wireless radio frame, wherein the transmission window portion of the Bluetooth interval overlaps at least in part with the wireless radio frame, and wherein one of the signals notifies the second transceiver of the scheduled timeperiod,
   wherein the second transceiver is operable to delay the transmitting of a Bluetooth transmission until the retransmission window portion of the Bluetooth interval in the unscheduled timeperiod to avoid a potential TX/RX conflict, the transmitting occurring during the unscheduled timeperiod that occurs after the scheduled timeperiod, and the potential TX/RX conflict being when a transmission according to the wireless access network protocol would potentially interfere with a Bluetooth reception or a Bluetooth transmission would potentially interfere with a reception according to the wireless access network protocol,
   wherein the offset in a synchronization signal, on the synchronization link, is determined based on whether a potential conflict is the potential TX/RX conflict or a potential TX/TX conflict.

2. The wireless communication device of claim 1, wherein the Bluetooth interval includes six consecutive Bluetooth slots, and wherein the one of the signals allowing the second transceiver to synchronize the Bluetooth interval with the offset causes the second transceiver to be synchronized with the offset such that a start of at least one Bluetooth interval is one Bluetooth slot offset from a start of at least one wireless radio frame for the potential TX/RX conflict.

3. The wireless communication device of claim 1, wherein the signals from the coexist controller are received over a wired connection, and
   wherein the second transceiver is further synchronized with the offset such that the start of at least one Bluetooth interval is a zero Bluetooth slot offset for a potential TX/TX conflict, the potential TX/TX conflict being when a wireless access network protocol transmission would potentially interfere with a Bluetooth transmission.

4. The wireless communication device of claim 1, wherein the second transceiver receives at least one of the signals from the coexist controller when the first transceiver is receiving.

5. The wireless communication device of claim 4, wherein the signals allow the second transceiver to arrange transmissions to not temporally overlap with receptions by the first transceiver.

6. The wireless communication device of claim 1, wherein the second transceiver receives at least one of the signals from the coexist controller while the first transceiver is transmitting.

7. The wireless communication device of claim 6, wherein the signals allow the second transceiver to arrange transmissions to not temporally overlap with transmissions by the first transceiver.

8. The wireless communication device of claim 1, further comprising a third transceiver; and
   an OR gate having inputs connected to the third transceiver and the coexist controller and having an output connected to the second transceiver, the OR gate to receive and send signals from the third transceiver and the coexist controller to the second transceiver.

9. The wireless communication device of claim 1, further comprising a third transceiver; and
   a proxy connected to the first transceiver, the second transceiver and the third transceiver, the proxy including the coexist controller.

10. A method for reducing interference comprising:
    receiving at a second radio a synchronization signal, having an offset, from a first radio, wherein the first radio is configured to transmit and receive frames during a scheduled timeperiod according to a wireless wide area network protocol, and wherein the second radio is configured to transmit and receive for a wireless personal area network protocol during an unscheduled timeperiod, and wherein the second radio is configured to refrain from transmitting and receiving during the scheduled timeperiod;
    synchronizing transmissions of the wireless personal area network protocol from the second radio with the synchronization signal;
    determining the offset based on whether a potential conflict is a potential TX/RX conflict or a potential TX/TX conflict;

wherein the synchronization signal is configured to cause transmissions of the wireless personal area network protocol to be synchronized with respect to the offset from a start of a frame of the wireless wide area network protocol, such that a start of at least one interval for the wireless personal area network protocol transmitted by the second radio is at least one slot offset from a start of at least one wireless wide area network protocol frame transmitted by the first radio for the potential TX/RX conflict, wherein the at least one interval for the wireless personal area network protocol includes a transmission window portion and a retransmission window portion, and wherein the transmission window portion of the at least one interval overlaps at least in part with the at least one wireless wide area network protocol frame;

receiving an active signal from the first radio at the second radio, the active signal indicating a timeperiod to refrain from transmission;

refraining from transmitting from the second radio during the timeperiod, the timeperiod including times when the first radio is receiving; and transmitting from the second radio during the retransmission window portion of the at least one interval, the transmitting occurring after the timeperiod, wherein the transmission window portion of the at least one interval overlaps at least in part with the wireless radio frame, and wherein the potential TX/RX conflict is when a transmission according to the wireless wide area network protocol would potentially interfere with a reception according to the wireless personal area network protocol or a transmission according to the wireless personal area network protocol would potentially interfere with a reception according to the wireless wide area network protocol.

11. The method of claim 10, further comprising receiving a signal notifying the second radio to poll a transmitting device and cause a retransmission from the transmitting device to the second radio, wherein the second radio is operable to delay the poll and receiving of the retransmission from the transmitting device until the retransmission window portion of the at least one interval for the wireless personal area network protocol, the receiving occurring after a timeperiod allocated for transmission of the wireless wide area network protocol frame.

12. The method of claim 10, wherein the second radio is a Bluetooth radio, wherein the wireless personal area network protocol is a protocol provided according to the Bluetooth standard, wherein the at least one interval for the wireless personal area network protocol is a Bluetooth interval, and wherein the Bluetooth interval includes six consecutive Bluetooth slots.

13. The method of claim 12, further comprising:
using a Bluetooth EV3 link; and
following standard EV3 retransmission policies.

14. The method of claim 13, wherein refraining from transmitting is treated as a failed transmission.

15. The method of claim 10, wherein the synchronization signal is a periodic signal.

16. The method of claim 10, wherein the second radio receives the active signal from the first radio when the first radio is receiving.

17. The method of claim 10, wherein the second radio receives the active signal from the first radio when the first radio is transmitting.

18. The method of claim 10, wherein the wireless wide area network protocol is used for communication with wireless communication devices including wireless telephones, and wherein the wireless wide area network protocol supports communications using multiple-input multiple-output (MIMO) and beam-forming techniques.

19. A radio comprising:
a transmitter configured to operate in accordance with a first transmission protocol and to transmit and receive within a unscheduled timeperiod, and configured to refrain from transmitting and receiving within a scheduled timeperiod that does not overlap the unscheduled timeperiod;
a clock connected to the transmitter to regulate transmission timing;
a synchronization link input to receive signals from a source to synchronize the clock, wherein intervals of the first transmission protocol are synchronized with an offset, determined based on whether a potential conflict is a potential TX/RX conflict or a potential TX/TX conflict, with respect to frames transmitted by the source according to a second transmission protocol, such that a start of at least one interval of the first transmission protocol is offset from a start of at least one frame transmitted according to the second transmission protocol for the potential TX/RX conflict, the potential TX/RX conflict being when a second transmission protocol transmission would potentially interfere with a first transmission protocol reception or a first transmission protocol transmission would potentially interfere with the second transmission protocol reception, wherein the at least one interval for the first transmission protocol includes a transmission window portion and a retransmission window portion, and wherein the transmission window portion of the at least one interval overlaps at least in part with the at least one frame transmitted according to the second transmission protocol; and
an active link input to receive signals from a source to alert the transmitter to refrain from transmitting until the retransmission window portion of the first transmission protocol, the transmitting not overlapping with a transmission of a second transmission protocol frame of the source.

20. The radio of claim 19, wherein the source is an external radio, the external radio configured to transmit and receive transmissions according to the second transmission protocol.

21. The radio of claim 20, wherein the first transmission protocol is used on a wireless personal area network, and wherein the second transmission protocol is used on a broadband wireless network.

22. The radio of claim 21, wherein the first transmission protocol is a Bluetooth transmission protocol, and wherein the at least one interval is a Bluetooth interval including six consecutive Bluetooth slots.

* * * * *